Oct. 28, 1952     E. OUTREBON     2,615,705
AUTOMATIC PLATFORM SCALE
Filed July 11, 1947     2 SHEETS—SHEET 1
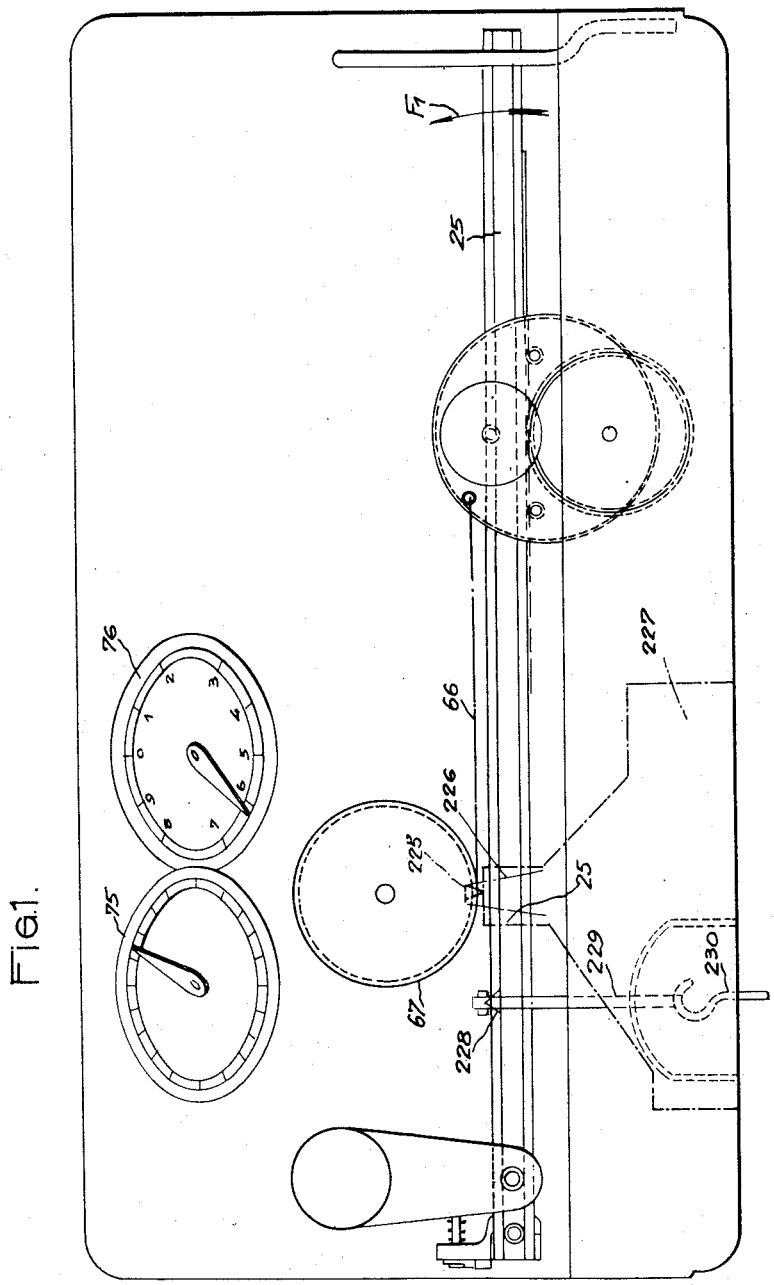
INVENTOR
Eugene Outrebon
By Richardson, David and Nordon
his ATTYS.

Oct. 28, 1952  E. OUTREBON  2,615,705
AUTOMATIC PLATFORM SCALE
Filed July 11, 1947  2 SHEETS—SHEET 2
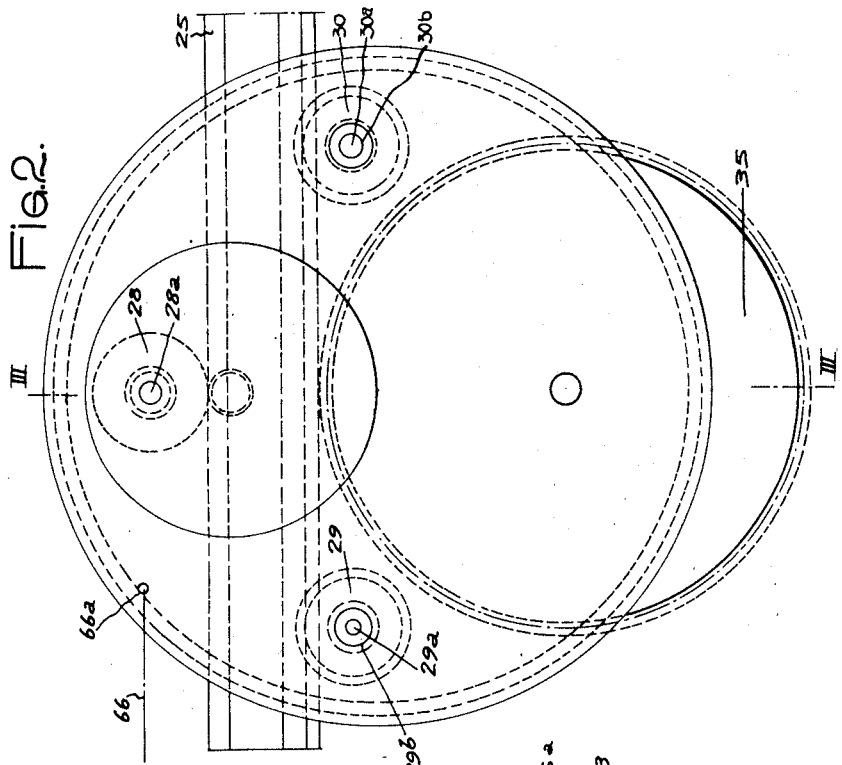
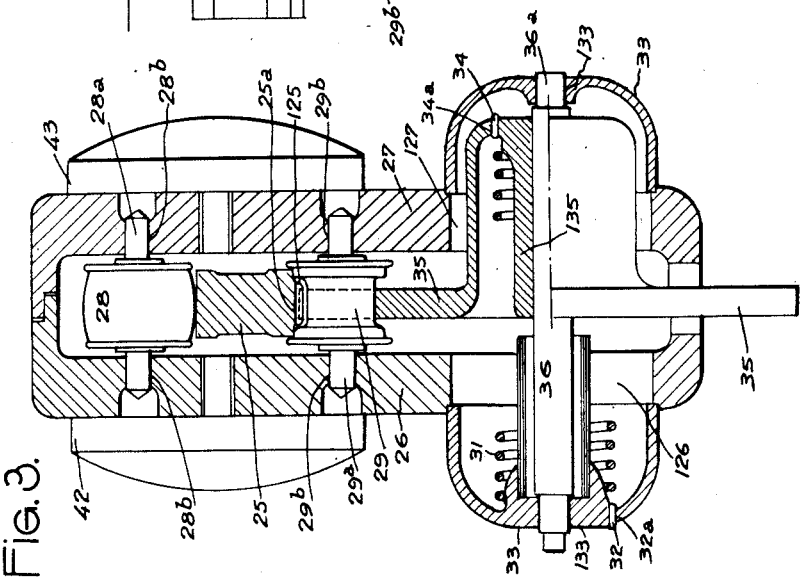
INVENTOR
Eugene Outrebon
By Richardson, David and Hordon
his ATTYS.

Patented Oct. 28, 1952

2,615,705

UNITED STATES PATENT OFFICE 2,615,705

AUTOMATIC PLATFORM SCALE

Eugène Outrebon, Bethune, Pas-de-Calais, France, assignor to Manufacture d'Horlogerie de Bethune, Bethune, Pas-de-Calais, France, a company of France Application July 11, 1947, Serial No. 760,277
In France April 2, 1942

Section 1, Public Law 690, August 8, 1946
Patent expires April 2, 1962

2 Claims. (Cl. 265—56)

Automatic platform scales are already known in which a movable weight device, actuated by a driving disc member, moves along the beam and acts during its displacement, through a transmission member, on a mechanism ensuring the regulation, and then the slowing down of its speed of displacement. The regulating and slowing mechanism is controlled, further, by a trigger device associated with the beam, the pivoting of which, during the displacement of the movable weight device, triggers a device which controls a clutch causing the actuation of a brake, and then, finally, the stopping of the scale mechanism when the beam is in equilibrium.

The transmission member between the movable weight device and the regulating and slowing mechanism is in the form of a tape associated, on the one hand, with the movable weight device and, on the other hand, with a development wheel on which it is wound when the scale is at rest. The development wheel is in engagement, through gears, with a slug type regulator ensuring a regular displacement of the movable weight device during its high speed run. During this displacement, the beam pivots gently and this motion releases the trigger device which acts on a clutch engaging a brake, consisting, for instance, of a vane type governor connected, through a gear train, with the development wheel.

The object of the invention is to provide an improved movable weight device including a disc member of large circumference driven by a helical torsion spring and provided with guiding rollers.

Fig. 1 is a front elevation of the improved scale, parts of the housing being removed and the parts of the apparatus being shown in operative position.

Fig. 2 is a schematic elevation of the self-propelling movable weight device.

Fig. 3 is a cross-sectional view taken on the plane of the line III—III of Fig. 2.

In Fig. 1, the beam 25 of the scale is shown mounted pivotally about a knife-edge 225 supported by two opposed flanges 226 attached to the beam. The knife 225 is placed upon a member 27 of the frame of the scale. A knife edge support 228 formed on the beam 25 supports a yoke 229, the latter being connected through a hooked rod 230 with the scale apron.

The self-propelling movable weight device shown in Figs. 2 and 3 consists of a frame formed of two shallow dish-shaped plates 26 and 27 which are secured together along their edges in any suitable manner.

An upper roller 28, as viewed in Fig. 3, is mounted on an axle 28a journalled in bearings 28b drilled in the frame plates 26 and 27. Two lower flanged rollers 29 and 30, mounted on axles 29a and 30a resting respectively in bearings 20b and 30b, drilled in the plates 26 and 27 and offset from the vertical plane of the upper roller 28, constitute the supports and guides for the movable weight device in its movement on the beam 25 of the scale. This beam is substantially rectangular in cross section and is formed with a rack 125 on its lower face 25a.

The frame plates 26 and 27 are drilled, at their lower portions, with opposed openings 126 and 127, respectively, and positioned in each opening is a cup-shaped member 33. Each cup-shaped member has a central opening forming a bearing portion 133 for receiving the ends of a shaft 36 on which is keyed a disc member 35, the periphery of which is toothed and meshes with the rack 125 of the beam 25. The disc member 35 is formed with a hollow hub 135.

A spiral spring 31 has one end 32 fastened in a hole 32a, bored in the left hand cup 33 (Fig. 3), and has its other end 34 fastened in a hole 34a, bored in the bottom of the hub 135 of the disc member 35.

Two weighted members 42 and 43 are secured by any suitable means on the sides of the frame plates 26 and 27 at their upper portions. Each of these weighted members contains a variable weight device of lead for balancing the self-propelling movable weight device so as to correctly adjust the scale.

A metal tape 66 is attached at 66a to the movable weight device and connects the latter with the development wheel 67 of the scale 25. A gear train (not shown), actuated by the development wheel, controls the indicating devices of the scale, such as the dials 75 and 76 (Fig. 1).

The operation of the scale is as follows:

When the scale is at rest, the self-propelling movable weight device is placed near the development wheel 67. During the return motion of the self-propelling movable weight device towards the development wheel, the disc member 35, which has turned clockwise, has stretched the spring 31.

When the scale is at rest, the gear train mechanism, connecting the development wheel with the various indicating devices of the scale, is locked. The development wheel, therefore, cannot turn and the self-propelling movable weight device, is locked.

When it is desired to weigh goods by means of the scale, these goods are placed on the scale platform and the scale unlocked. This operation immediately causes the scale to become unbalanced and the beam 25 to pivot in the direction of the arrow $F_1$ (Fig. 1). The beam being free, the development wheel 67 can turn. The spring 31 of the self-propelling movable weight device is released and drives, with the movable weight device, the development wheel by means of the tape 66.

When equilibrium is reached, i. e. when the beam is horizontal, the self-propelling movable weight device is stopped by the triggering of a lock controlled by the beam 25 acting upon the gear trains of the indicating devices controlled by the wheel.

I claim:

1. In an automatic platform scale, a frame, a beam pivotally supported by said frame and having a rack on its under side, a self-propelling movable weight device movable over said beam and including opposed spaced side walls with openings therein, two stationary cups mounted in the openings in said side walls, a shaft supported by said cups, a toothed disc member secured on said shaft, an upper guiding roller supported between said side walls, two lower guiding rollers supported by said side walls, a helical torsion spring having an end secured to one of said stationary cups and having its other end secured to said disc member, the periphery of said disc member meshing with said rack, a development wheel mounted on said frame, and a transmission band secured at one end to said movable weight device and wound around said development wheel for controlling the indicating and recording system of the platform scale.

2. In an automatic platform scale, a frame, a beam having a rack on its under side pivotally supported in said frame, a self-propelling movable weight device having two side walls, two stationary cups supported by said side walls, a shaft supported by said cups, a toothed disc member secured on said shaft, an upper guiding roller between the side walls, two lower guiding rollers between the side walls, a helical torsion spring having an end secured to one of said stationary cups and having its other end secured to said disc member, the teeth of said disc member meshing with said rack, two weighted devices secured to the exterior of said side walls, a development wheel mounted on said frame, and a transmission band secured to said movable weight device at one end and wound on said development wheel for controlling the indicating and recording systems of the platform scale.

EUGÈNE OUTREBON.

REFERENCES CITED

The following references are of record in the file of this patent:

UNITED STATES PATENTS

| Number | Name | Date |
|---|---|---|
| 770,126 | Steiger | Sept. 13, 1904 |
| 1,157,716 | Outrebon | Oct. 26, 1915 |

FOREIGN PATENTS

| Number | Country | Date |
|---|---|---|
| 22,218 | Great Britain | Dec. 1, 1913 |